US009436171B2

(12) United States Patent
Sato

(10) Patent No.: US 9,436,171 B2
(45) Date of Patent: Sep. 6, 2016

(54) MOTOR CONTROL SYSTEM, MOTOR CONTROL DEVICE, BRUSHLESS MOTOR, AND MOTOR CONTROL METHOD

(71) Applicant: Panasonic Corporation, Osaka (JP)

(72) Inventor: Daisuke Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 293 days.

(21) Appl. No.: 14/351,369

(22) PCT Filed: Jan. 17, 2013

(86) PCT No.: PCT/JP2013/000180
§ 371 (c)(1),
(2) Date: Apr. 11, 2014

(87) PCT Pub. No.: WO2013/136645
PCT Pub. Date: Sep. 19, 2013

(65) Prior Publication Data
US 2014/0257574 A1   Sep. 11, 2014

(30) Foreign Application Priority Data

Mar. 12, 2012 (JP) ................. 2012-054148

(51) Int. Cl.
*G05B 15/02* (2006.01)
*H04B 3/50* (2006.01)
(Continued)

(52) U.S. Cl.
CPC ............. *G05B 15/02* (2013.01); *H02P 6/06* (2013.01); *H04B 3/50* (2013.01); *H04B 14/026* (2013.01)

(58) Field of Classification Search
CPC ........... G05B 15/02; H02P 6/06; H04B 3/50; H04B 14/026
See application file for complete search history.

(56) References Cited

U.S. PATENT DOCUMENTS 4,673,859 A    6/1987  Shero et al.
4,874,997 A  * 10/1989  Daggett ................ B25J 13/088
                                                                 318/565

(Continued)

FOREIGN PATENT DOCUMENTS

CN    86101211       2/1987
JP    2007-68347 A   3/2007
(Continued)

OTHER PUBLICATIONS

International Search Report for PCT/JP2013/000180, Apr. 23, 2013.
(Continued)

*Primary Examiner* — Ramesh Patel
(74) *Attorney, Agent, or Firm* — RatnerPrestia

(57) ABSTRACT

A motor control system comprises a host controller for transmitting a command signal and receiving an information signal, a motor control device for receiving the command signal and transmitting the information signal, a signal transmission line for transmitting the command signal and the information signal, and a motor of which rotation is controlled by the motor control device. The host controller generates and transmits PWM command signal Si having a duty factor modulated by the command signal. The motor control device generates PWM information signal Fp having a duty factor modulated by the information signal, and transmits PWM information signal Fp in synchronization with PWM command signal Si. PWM command signal Si transmitted by the host controller includes a plurality of pulse periods having different pulse-period durations from one another.

11 Claims, 8 Drawing Sheets

(51) Int. Cl.
*H02P 6/06* (2006.01)
*H04B 14/02* (2006.01)

(56) References Cited

U.S. PATENT DOCUMENTS

| | | | | | |
|---|---|---|---|---|---|
| 5,625,264 | A * | 4/1997 | Yoon | ............ | H02P 6/10 318/400.02 |
| 6,452,349 | B1 * | 9/2002 | Hahn | ............ | H02P 6/24 318/400.22 |
| 7,148,651 | B2 * | 12/2006 | Tobari | ............ | H02P 6/085 318/700 |
| 8,686,678 | B2 * | 4/2014 | Hirt | ............ | H02P 7/28 318/503 |
| 8,847,537 | B2 * | 9/2014 | Lee | ............ | H02P 27/04 318/400.06 |
| 2003/0071595 | A1 * | 4/2003 | Cho | ............ | H02P 7/29 318/599 |
| 2006/0110140 | A1 * | 5/2006 | Harada | ............ | H02P 6/06 388/804 |
| 2007/0046229 | A1 * | 3/2007 | Ogino | ............ | H02P 7/2913 318/268 |
| 2008/0112695 | A1 | 5/2008 | Kanamori | | |
| 2009/0167220 | A1 | 7/2009 | Kanamori | | |
| 2011/0279076 | A1 * | 11/2011 | Hirt | ............ | H02P 7/28 318/503 |

FOREIGN PATENT DOCUMENTS

| | | |
|---|---|---|
| JP | 2007-82360 A | 3/2007 |
| JP | 2007-335811 A | 12/2007 |
| JP | 2008-148542 A | 6/2008 |
| JP | 2009-104907 A | 5/2009 |
| JP | 2010-45941 A | 2/2010 |
| JP | 2010-213377 | 9/2010 |
| JP | 2011-130532 A | 6/2011 |
| JP | 2012-5254 A | 1/2012 |

OTHER PUBLICATIONS

The Extended European Search Report dated Aug. 4, 2015 for the related European Patent Application No. 13760639.8.
Wasi Uddin et al: "A chirp PWM scheme for brushless DC motor drives", Energy Conversion Congress and Exposition (ECCE), 2012 IEEE, IEEE, Sep. 15, 2012, pp. 3317-3323, XP032467162.
English Translation of Chinese Search Report dated Dec. 4, 2014 for the related Chinese Patent Application No. 201380003886.9.

* cited by examiner

MOTOR CONTROL SYSTEM, MOTOR CONTROL DEVICE, BRUSHLESS MOTOR, AND MOTOR CONTROL METHOD

TECHNICAL FIELD

The present invention relates to a motor control system provided with a motor control device for controlling rotation of a motor according to a command of a host controller or the like, the motor control device, a brushless motor equipped with the motor control device, and a motor control method. In particular, the invention relates to the motor control system, the motor control device, the brushless motor and the motor control method for controlling a rotation speed of the motor by using a pulse-width modulated ("PWM") signal that is a pulse signal having a duty factor modulated by a speed command signal.

BACKGROUND ART

A technique of controlling a fan motor mounted to a vehicle with a host controller such as an electric control unit ("ECU"), for instance, is disclosed in patent literature 1, as one example of hitherto available motor control systems including such motor control devices. The host controller in this literature supplies a rotation speed command of a fan in a form of PWM signal to a brushless motor equipped with a drive control circuit. The drive control circuit thus rotates the fan at a rotation speed corresponding to a duty factor of the PWM signal. Besides, patent literature 2 discloses a structure in which a motor control unit outputs a rotation detection signal to a host controller, for instance, in addition to a rotation speed command in a form of PWM signal.

Incidentally, there is growing number of cases in recent years for such motor control systems that are controlled by digital signals using pulse signals. There increases a possibility with such digital processing to cause adverse influence to other apparatuses due to electromagnetic radiation of noises attributable to pulse signals while providing flexibility in the processing. In the case of the above motor control system mounted to a vehicle, for instance, electromagnetic noises are radiated from a main motor body, a power supply, control lines and the like which give rise to a risk of adverse influence to such devices as a radio mounted to the vehicle.

Certain means have been used to suppress the influence of noises of this kind, such as installing a noise eliminating circuit using capacitors and inductance elements, shielding a source of the noise emission, and providing a structure that enables the shortest possible routing of feeding lines and control lines. In addition, patent literature 3 discloses a method of reducing spurious electromagnetic emission in a vehicle by transmitting signals using a cable of twisted-pair structure to cancel out magnetic fields generated by the propagating signals.

In the methods for reducing electromagnetic emission such as those discussed above associated with the noise eliminating circuit, shielding means, and the cables of twisted-pair structure, however, there remain some drawbacks that they increase a number of the circuit components and shielding members for the noise preventive measures, and necessitate special cable materials like the twisted-pair cables. There is also a problem with the structure of shortening the feeding lines and control lines because they impose limitations on the mounting flexibility of the power supply, motor and the like.

CITATION LIST

Patent Literature

PTL 1: Unexamined Japanese Patent Publication No. 2008-148542
PTL 2: Unexamined Japanese Patent Publication No. 2011-130532
PTL 3: Unexamined Japanese Patent Publication No. 2009-104907

SUMMARY OF THE INVENTION

A motor control system of the present invention is a control system provided with a motor control device for controlling rotation of a motor according to a command of a host controller. The motor control system comprises a host controller for generating a PWM command signal based on a command signal, transmitting the PWM command signal generated and receiving a PWM information signal generated based on an information signal, a motor control device for receiving the PWM command signal generated based on the command signal, generating the PWM information signal based on the information signal and transmitting the PWM information signal generated, a signal transmission line for transmitting the PWM command signal and the PWM information signal individually as pulse signals, and a motor of which rotation is controlled by the motor control device. The host controller generates the PWM command signal of which a duty factor, i.e. a ratio of a pulse width to pulse-period duration, is modulated by the command signal, and transmits the PWM command signal to the motor control device via the signal transmission line. The motor control device generates the PWM information signal of which a duty factor is modulated by the information signal, and transmits the PWM information signal in synchronization with the PWM command signal to the host controller via the signal transmission line. The PWM command signal transmitted by the host controller includes a plurality of pulse periods having different pulse-period durations from one another.

A motor control device of the present invention is a control device configured to receive a PWM command signal including a plurality of pulse periods having different pulse-period durations from one another, and each of which a duty factor, i.e. a ratio of a pulse width to pulse-period duration, is modulated by a command signal, and to control operation of a motor in a manner to rotate according to the command signal restored from the PWM command signal received. The motor control device comprises a PWM demodulating section for demodulating the PWM command signal and restoring the command signal, a rotation control section for generating the driving signal of the motor according to the command signal, a power drive section for generating a drive voltage to energize and drive a winding of the motor based on the driving signal, an information signal generating section for generating the information signal to be transmitted to outside, and a PWM modulating section for generating a PWM information signal of which the duty factor is modulated by the information signal. The PWM modulating section is configured to generate the PWM information signal in synchronization with pulse-period durations of the PWM command signal, and output the same.

A brushless motor of the present invention has a structure comprising a rotor, a stator provided with a three-phase winding, and the motor control device described above for energizing and driving the winding.

Furthermore, a motor control method of the present invention is a method for controlling a motor by transmitting a PWM command signal generated based on a command signal from a host controller, receiving the PWM command signal in a motor control device, and controlling the motor in a manner to rotate according to the command signal restored from the PWM command signal received. In this motor control method, the host controller transmits to the motor control device a PWM command signal including a plurality of pulse periods having different pulse-period durations from one another, and having a duty factor, i.e. a ratio of a pulse width to pulse-period duration, modulated by the command signal. The motor control device restores the command signal from the PWM command signal received, rotates the motor based on the restored command signal, and generates an information signal to be transmitted to outside. The motor control device also generates a PWM information signal having a duty factor modulated by the information signal in synchronization with the pulse periods of the PWM command signal. The motor control device then outputs the generated PWM information signal to the host controller.

According to the configurations stated above, the PWM command signal and the PWM information signal become equal in their durations of pulse periods because of the synchronization, and both these signals are transmitted in directions opposite to each other. As a result, magnetic field radiated from a transmission line of the PWM command signal and magnetic field radiated from a transmission line of the PWM information signal become generally opposite in their directions at all the time. Unwanted emissions radiated from both the transmission lines are thus cancelled out, and spurious emissions can be reduced.

In addition, frequency components of the PWM command signal and the PWM information signal synchronized with the PWM command signal are not concentrated on one frequency but spread out widely, since the PWM command signal includes a plurality of pulse periods having different pulse-period durations from one another, which can keep them at low levels. Therefore, the unwanted emissions radiated from both the transmission lines can be reduced even further.

As stated above, the motor control system, the motor control device, the brushless motor and the motor control method of the present invention can reduce the spurious emissions by simply changing pulse-period durations of the PWM command signal transmitted from the host controller, and by simply synchronizing the pulse periods of the PWM information signal transmitted from the motor side with pulse periods of the received PWM command signal. Accordingly, the present invention can provide the motor control system, the motor control device, the brushless motor and the motor control method with an advantage of reducing the spurious emissions with simple structures not requiring any special component and material for the noise preventive measures.

DESCRIPTION OF EMBODIMENTS

Description is provided hereinafter of a motor control system, a motor control device, a brushless motor and a motor control method according to exemplary embodiments of the present invention with reference to the accompanying drawings.

Exemplary Embodiment

Figure 1:
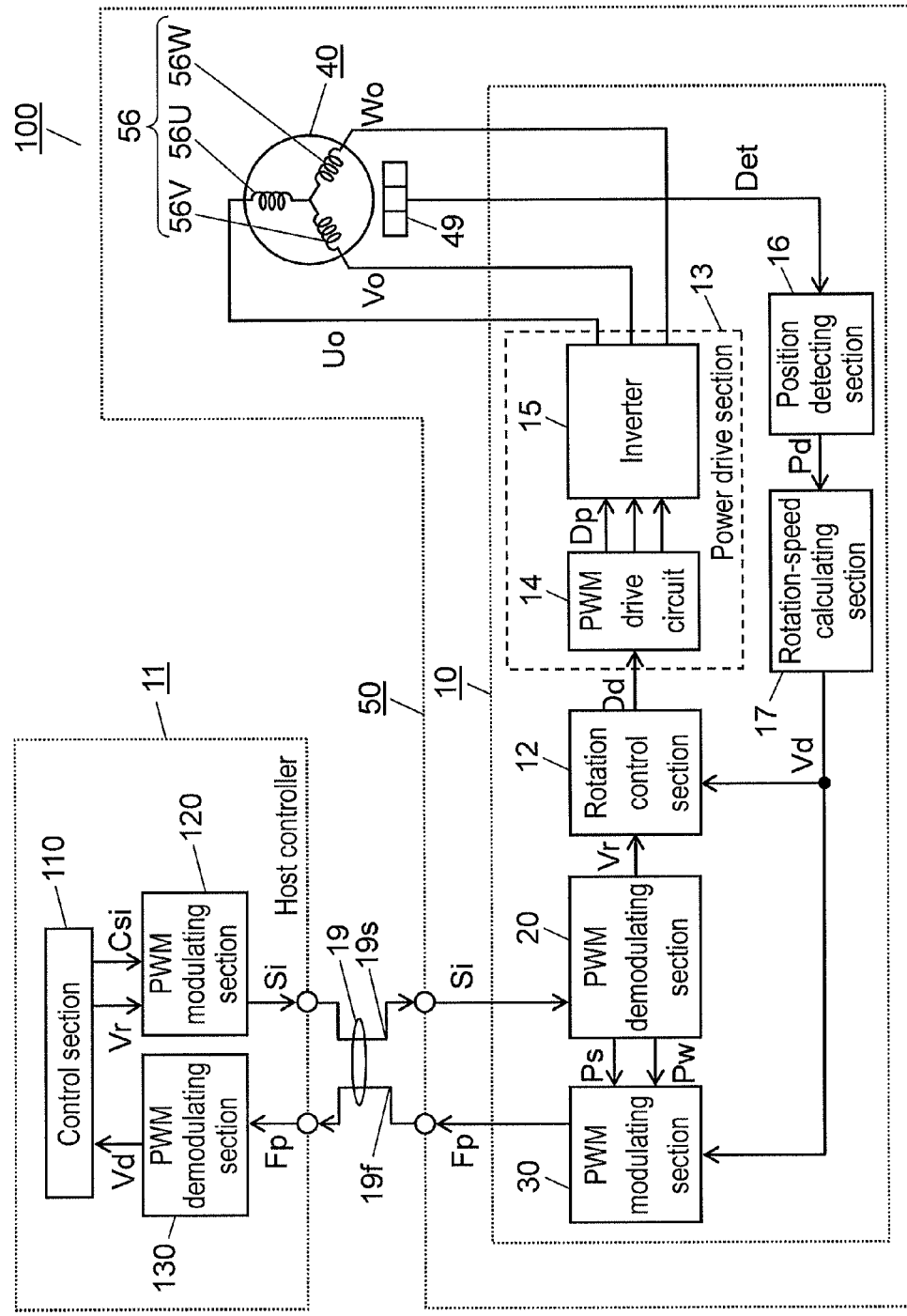
FIG. 1 is a block diagram of a motor control system according to one exemplary embodiment of the present invention.

FIG. 1 is a block diagram of motor control system 100 according to one exemplary embodiment of the present invention. In this exemplary embodiment, description is given of a structure of motor control system 100 including brushless motor 50 provided with motor control device 10 of this invention.

As shown in FIG. 1, motor control system 100 of this exemplary embodiment has a structure comprising brushless motor 50, and host controller 11 used to control brushless motor 50. In this embodiment, brushless motor 50 is so constructed that it includes internally mounted circuit components that make up motor control device 10, details of which will be described later. In other words, motor control device 10 in brushless motor 50 controls rotation of motor 40, as shown in FIG. 1.

Motor 40 comprises a rotor and a stator provided with windings 56, and the rotor rotates when windings 56 are energized. Description given in this embodiment is an example of brushless motor 50 in which motor 40 is driven with a three-phase source having U-phase, V-phase and W-phase that are offset by 120 degrees from one another. Motor 40 has windings 56 to make such three-phase operation, which include winding 56U driven in the U-phase, winding 56V driven in the V-phase and winding 56W driven in the W-phase.

Motor control device 10 supplies a drive voltage of a predetermined waveform to each phase of windings 56. As a result, the rotor rotates at a rotation speed according to rotational control of motor control device 10. Motor 40 is provided with a sensor for detecting a rotating position and rotation speed of the rotor in order to carry out such rotational control. In this exemplary embodiment, motor 40 has three position detection sensors 49 such as hall elements disposed to locations corresponding to the individual phases for detecting a rotating position of the rotor. Sensor signal Det is supplied to motor control device 10 from position detection sensors 49.

Motor control device 10 is also in signal communication with host controller 11 through signal transmission lines 19 as shown in FIG. 1.

Host controller 11 is located in an apparatus to which brushless motor 50 is mounted, for example, and it is composed of a microcomputer, a digital signal processor ("DSP"), or the like device. In an instance that brushless motor 50 is an electrical component mounted to a vehicle, host controller 11 may be such a controller as an ECU. A command for controlling rotation of motor 40 is transmitted from such host controller 11 as a command signal to motor control device 10 through signal transmission lines 19. On the other hand, status information of brushless motor 50 is transmitted from motor control device 10 as an information signal to host controller 11 through signal transmission lines 19.

In this exemplary embodiment, a rotation speed command that directs motor 40 for a rotation speed is transmitted to motor control device 10 as a command from host controller 11. The rotation speed directed by the rotation speed command is transmitted through signal transmission line 19s as pulse-width modulated PWM command signal Si.

In addition, predetermined information is transmitted from motor control device 10 as an information signal to host controller 11. Description is provided in this embodiment by taking an example in which the information to be transmitted is information of a detected rotation speed. That is, motor control device 10 sends information indicating the detected rotation speed as the information signal to host controller 11. Here, the detected rotation speed means a rotation speed of motor 40 detected by motor control device 10, and it represents an actual rotation speed. This information signal is pulse-width modulated, and transmitted as PWM information signal Fp to host controller 11 through signal transmission line 19f in the same manner as PWM command signal Si. A numerical figure denoting number of revolutions per minute (rpm) is used, for instance, for the rotation speed command and the detected rotation speed.

As stated, host controller 11 transmits the command signal and receives the information signal. Motor control device 10 receives the command signal and transmits the information signal. Signal transmission lines 19 transmit the command signal and the information signal individually. Motor 40 is controlled to rotate by motor control device 10. According to the structure, as discussed, motor control device 10 controls rotation of motor 40 according to the command of host controller 11.

A structure of host controller 11 is described next. As shown in FIG. 1, host controller 11 comprises control section 110, PWM modulating section 120 and PWM demodulating section 130. Host controller 11 is connected with motor control device 10 through signal transmission lines 19 for transmitting a PWM signal. Control section 110 carries out various processes, interfacing process with the outside, and other control tasks inside host controller 11 including, for instance, generation of a command signal for motor control device 10. Control section 110 supplies PWM modulating section 120 with speed command signal Vr which is a command signal indicating a rotation speed, and modulation command signal Csi for dictating and controlling PWM modulating section 120. In addition, control section 110 receives via PWM demodulating section 130 an information signal transmitted from motor control device 10.

PWM modulating section 120 generates PWM command signal Si that is pulse-width modulated by speed command signal Vr supplied to it. PWM command signal Si in this exemplary embodiment is a signal formed of pulse train that includes a plurality of pulse periods having different pulse-period durations from one another, though details of which will be described later. Furthermore, in order for PWM command signal Si to have the pulse periods of varying durations, a duty factor of each pulse is modulated by speed command signal Vr. Here, the duty factor means a ratio of pulse width to pulse-period duration. In other words, PWM modulating section 120 determines individual pulse-period duration first, and then determines a pulse width corresponding to speed command signal Vr with reference to the determined pulse-period duration in every process of generating each pulse. PWM modulating section 120 then maintains an ON state of high level only for the determined time of pulse width within the determined time duration of the pulse period, followed by an OFF state of low level for the remaining time excluding the ON state, to thus generate the pulses in a sequential manner, which becomes PWM command signal Si. PWM modulating section 120 sends such PWM command signal Si to motor control device 10 through signal transmission line 19s.

On the other hand, PWM demodulating section 130 receives PWM information signal Fp transmitted from motor control device 10, and performs demodulation of this pulse-width modulated signal. By this demodulating operation, PWM demodulating section 130 restores detected speed signal Vd representing an information signal from the received PWM information signal Fp. Detected speed signal Vd is a signal that indicates an actual rotation speed detected by motor control device 10, and PWM information signal Fp is a pulse signal formed of a pulse train having a duty factor corresponding to this detected speed signal Vd. PWM demodulating section 130 demodulates PWM information signal Fp by detecting the duty factor, a ratio of pulse width to pulse period during a cyclic period of each pulse of PWM information signal Fp. PWM demodulating section 130 then outputs detected speed signal Vd restored by the demodulating operation in the order of time sequence. The rotation speed detected by motor control device 10 is restored as detected speed signal Vd by the above operation of PWM demodulation section 130.

Described next is a structure of motor control device 10. Motor control device 10 comprises rotation control section 12, PWM drive circuit 14, inverter 15, position detecting section 16, rotation speed calculating section 17, PWM demodulating section 20 and PWM modulating section 30. As stated previously, sensor signal Det is supplied to motor control device 10 from each of three position detection sensors 49 disposed to motor 40. In addition, motor control device 10 is connected with host controller 11 via signal transmission lines 19 through which the PWM signal is transmitted.

First, sensor signal Det is supplied from position detection sensors 49 to position detecting section 16. Position detecting section 16 detects position information of the individual phases from sensor signal Det that varies according to changes in the magnetic polarity with rotation of the rotor. For instance, position detecting section 16 detects timing at which sensor signal Det shows zero-crossing at a point in time when the magnetic polarity changes, and outputs position detection signal Pd based on this detected timing. In other words, a rotating position of the rotor can be detected by using the detected timing since the rotating position corresponds to the detected timing. The position detection signal Pd may be a pulse signal showing such detected timing, as a specific example. Position detecting section 16 supplies position detection signal Pd corresponding to each of the phases to rotation speed calculating section 17.

Rotation speed calculating section 17 calculates a rotation speed of the rotor by differential operation, for instance, based on the rotating position provided by position detection signals Pd. Rotation speed calculating section 17 supplies the calculated rotation speed as detected speed signal Vd to rotation control section 12 and PWM modulating section 30. Although what has been described in this exemplary embodiment is one example in which detected speed signal Vd is generated based on sensor signal Det from position detection sensors 49, one example may instead be a structure configured to detect the rotor speed by using any speed detecting means and generate detected speed signal Vd according to a result of such detection. In other words, detected speed signal Vd needs to be just a value or signal in a time series that shows a speed actually detected or estimated from the rotating motor.

On the other hand, PWM demodulating section 20 receives PWM command signal Si transmitted from host controller 11, and carries out demodulation of this pulse-width modulated signal. By this demodulating operation, PWM demodulating section 20 restores speed command signal Vr from the received PWM command signal Si. PWM command signal Si is a pulse signal formed of a pulse train having a duty factor corresponding to the rotation speed directed by host controller 11. PWM demodulating section 20 demodulates PWM command signal Si by detecting the duty factor, or the ratio of pulse width to pulse period in each individual pulse period of the PWM command signal Si. PWM demodulating section 20 then outputs speed command signal Vr restored by the demodulation operation in the order of time sequence. The rotation speed command of host controller 11 is thus restored as speed command signal Vr by the above operation of PWM demodulating section 20.

Speed command signal Vr is supplied to rotation control section 12. Additionally, detected speed signal Vd calculated by rotation speed calculating section 17 is also supplied to rotation control section 12. Rotation control section 12 generates driving signal Dd representing a driving quantity for windings 56, based on speed command signal Vr and detected speed signal Vd. To be specific, rotation control section 12 obtains a deviation in speed between speed command signal Vr representing the speed command and detected speed signal Vd indicating the detected speed corresponding to the actual speed. Rotation control section 12 then generates driving signal Dd representing an amount of torque corresponding to the deviation in the speed, such that the actual speed conforms to the directed speed. Rotation control section 12 supplies this driving signal Dd to PWM drive circuit 14.

PWM drive circuit 14 generates driving waveforms for the individual phases to drive windings 56, pulse-width modulates each of the generated driving waveforms, and outputs them as driving pulse signals Dp. The driving waveforms are sinusoidal waves when windings 56 are driven with sine-wave voltages, or the driving waveforms are rectangular waves when driven with rectangular-pulse voltages. Amplitude of the driving waveforms is determined according to driving signal Dd. PWM drive circuit 14 thus makes pulse-width modulation of the driving waveforms generated for each of the phases as modulation signals, and supplies to inverter 15 these driving pulse signals Dp of pulse train that are pulse-width modulated by the driving waveforms.

Inverter 15 energizes and drives windings 56 by supplying power to the individual phases of windings 56 based on driving pulse signals Dp. Inverter 15 comprises a switching element connected to a positive side and another switching element connected to a negative side of the power supply for each of the U-phase, V-phase and W-phase. Driving output Uo for U-phase is connected to winding 56U, driving output Vo for V-phase is connected to winding 56V, and driving output Wo for W-phase is connected to winding 56W. The switching elements are turned on and off in the individual phases by their corresponding driving pulse signals Dp. Drive voltages are thus supplied from the power supply through the turned-on switching elements, and then from the driving outputs to individual windings 56. The supply of these drive voltages causes driving currents to flow through windings 56. Here, individual windings 56 are energized by the driving currents corresponding to the driving waveforms since driving pulse signals Dp are the signals that are pulse-width modulated by the driving waveforms.

PWM drive circuit 14 and inverter 15 make up power drive section 13. As discussed above, power drive section 13 drives motor 40 by energizing the individual phases of windings 56 according to driving signal Dd.

With the structure illustrated above, a feedback control loop is formed to control a rotation speed of the rotor in a manner to follow speed command signal Vr.

In addition, PWM modulating section 30 is provided in this exemplary embodiment. PWM modulating section 30 generates PWM information signal Fp by executing pulse-width modulation with detected speed signal Vd supplied as information signal. In order for PWM modulating section 30 to carry out such pulse-width modulation, PWM demodulating section 20 supplies to PWM modulating section 30 with pulse start signal Ps indicating start timing of the individual pulses to be sent out, and pulse period signal Pw indicating a cyclic period of each of the pulses. PWM modulating section 30 determines a pulse width of each pulse to be sent out based on detected speed signal Vd and pulse period signal Pw, and sequentially generates pulses each of which goes on only for the period of this pulse width from the timing of pulse start signal Ps. The pulse train generated in this manner is sent to host controller 11 through signal transmission line 19f as PWM information signal Fp.

In particular, the structure in this exemplary embodiment is so configured that the pulse period and phase of PWM information signal Fp are synchronizing with the pulse period and phase of PWM command signal Si. In other words, the period of PWM command signal Si is synchronized with the period of PWM information signal Fp by using pulse-period signal Pw, and the phase of PWM command signal Si is synchronized with the phase of PWM information signal Fp by the timing of pulse start signal Ps. According to this exemplary embodiment, magnetic field, which is caused by PWM information signal Fp, radiated from signal transmission line 19f becomes generally opposite in the direction to magnetic field radiated, which is caused by PWM command signal Si, from signal transmission line 19s, by virtue of the structure configured as above. As a result, unwanted emissions radiated from both signal transmission lines 19 are cancelled out, and the spurious emission can be reduced. In addition, PWM command signal Si in this embodiment is a signal formed of a pulse train that includes a plurality of pulse periods having different pulse-period durations from one another. As a result, frequency components included in the individual pulse periods are spread out and kept at a low level, so as to further reduce the spurious emission radiated from both the transmission lines.

Described next pertains to a detailed structure of PWM modulating section 120 and PWM demodulating section 130 in host controller 11.

Figure 2:
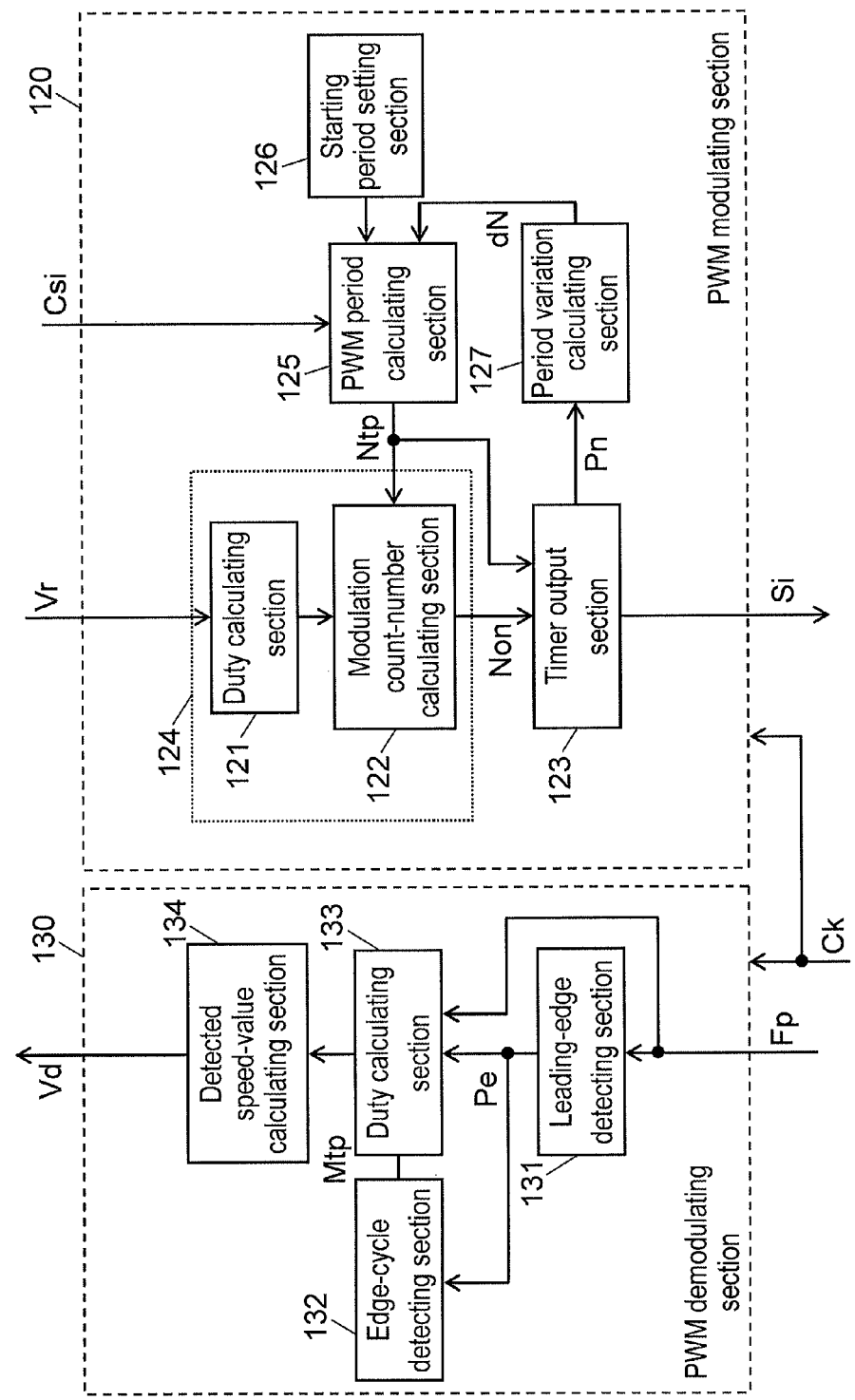
FIG. 2 is a block diagram of a PWM modulating section and a PWM demodulating section of a host controller of the motor control system.

FIG. 2 is a block diagram showing an exemplary structure of PWM modulating section 120 and PWM demodulating section 130 of host controller 11 according to this exemplary embodiment of the invention.

As shown in FIG. 2, clock signal Ck is supplied to PWM modulating section 120 and PWM demodulating section 130. The clock signal Ck is a pulse signal of regular cyclic periods, of which a frequency is substantially higher than frequencies of PWM command signal Si and PWM information signal Fp. For example, both the frequencies of PWM command signal Si and PWM information signal Fp are set at or about 500 Hz, and the frequency of clock signal Ck is set at 1 MHz. In the example shown in FIG. 2, the structure is so configured that the PWM signal is generated by counting clock signals Ck with a counter. As for the pulse period and pulse width, for instance, predetermined time durations are determined by using number of counts Cnt of clock signals Ck taken with the counter.

As described above, PWM modulating section 120 generates PWM command signal Si that includes a plurality of pulse periods having different pulse-period durations from one another. In order to generate such PWM command signal Si, PWM modulating section 120 is provided with duty calculating section 121, modulation count-number calculating section 122, timer output section 123, PWM period calculating section 125, starting period setting section 126, and period variation calculating section 127, as shown in FIG. 2. In addition, speed command signal Vr and modulation command signal Csi are supplied from control section 110 to PWM modulating section 120.

Duty calculating section 121 calculates a duty factor from speed command signal Vr supplied to it for the purpose of carrying out the pulse-width modulation. For example, duty calculating section 121 calculates a duty factor corresponding to a rotation speed indicated by speed command signal Vr, such that the duty factor is 50% when a value of speed command signal Vr is 1,000 (rpm), or the duty factor is 25% when the value is 500 (rpm).

On the other hand, PWM period calculating section 125 determines pulseperiod duration of each of the pulse periods in PWM command signal Si, and outputs it as count value Ntp corresponding to number of counts Cnt of the counter. That is, count value Ntp corresponds to the pulse-period duration. Accordingly, the counter is configured to count up to count value Ntp, so that the pulse-period duration can be varied by changing count value Ntp according to each of the pulse periods.

PWM period calculating section 125 outputs count value Ntp of an initial value supplied from starting period setting section 126 when modulation command signal Csi is transmitted. Following that, PWM period calculating section 125 sequentially outputs count values Ntp after changing each of their values by variation dN supplied by period variation calculating section 127. PWM period calculating section 125 again outputs count value Ntp of the initial value supplied from starting period setting section 126 when sequentially changed count value Ntp exceeds a predetermined largest value or when it becomes equal to or below a predetermined smallest value. By such operation of PWM period calculating section 125, count value Ntp of a different value is output for every pulse period. The count value Ntp is supplied to modulation count-number calculating section 122 and timer output section 123.

Modulation count-number calculating section 122 calculates a pulse width in an ON period of PWM command signal Si based on count value Ntp supplied from the PWM period calculating section 125 and a duty factor supplied from duty calculating section 121. To be specific, modulation count-number calculating section 122 multiplies count value Ntp corresponding to each of the pulse periods by the duty factor to calculate count value Non when generating PWM command signal Si. This count value Non corresponds to the pulse width of the ON period.

Duty calculating section 121 and modulation count-number calculating section 122 make up pulse-width calculating section 124. In other words, pulse-width calculating section 124 calculates the pulse width (i.e., count value Non) for each of ON periods of PWM command signal Si based on speed command signal Vr and the pulse-period duration (i.e., count value Ntp) calculated by PWM period calculating section 125.

Timer output section 123 is supplied with count value Ntp from PWM period calculating section 125, and count value Non from modulation count-number calculating section 122. Timer output section 123 generates a signal of pulse train of which each pulse goes on only for a period corresponding to count value Non with a pulse period corresponding to count value Ntp, based on these individually supplied count values. To be specific, timer output section 123 in this exemplary structure has a counter for counting a number of clock signals Ck to obtain number of counts Cnt. The counter in timer output section 123 starts counting from 0 (zero), and continues the counting up to count value Ntp. Timer output section 123 outputs an ON state for a period in which the number of counts Cnt comes from 0 (zero) to count value Non while the counting is continued in the above manner. Thereafter, timer output section 123 outputs an OFF state for another period from the point in time when number of counts Cnt exceeds count value Non and until it comes to count value Ntp. Timer output section 123 thus generates and outputs PWM command signal Si.

In addition, timer output section 123 supplies preparation command signal Pn to period variation calculating section 127 for directing it to start preparation of the next process, when the counter counts up to count value Non.

In response to the direction of preparation command signal Pn, period variation calculating section 127 calculates variation dN in count value Ntp between the present pulse period and the succeeding pulse period, and supplies the calculated value of variation dN to PWM period calculating section 125. PWM period calculating section 125 calculates count value Ntp by changing its value by the variation dN supplied from period variation calculating section 127, and outputs it as a value of the succeeding pulse period.

Figure 3:
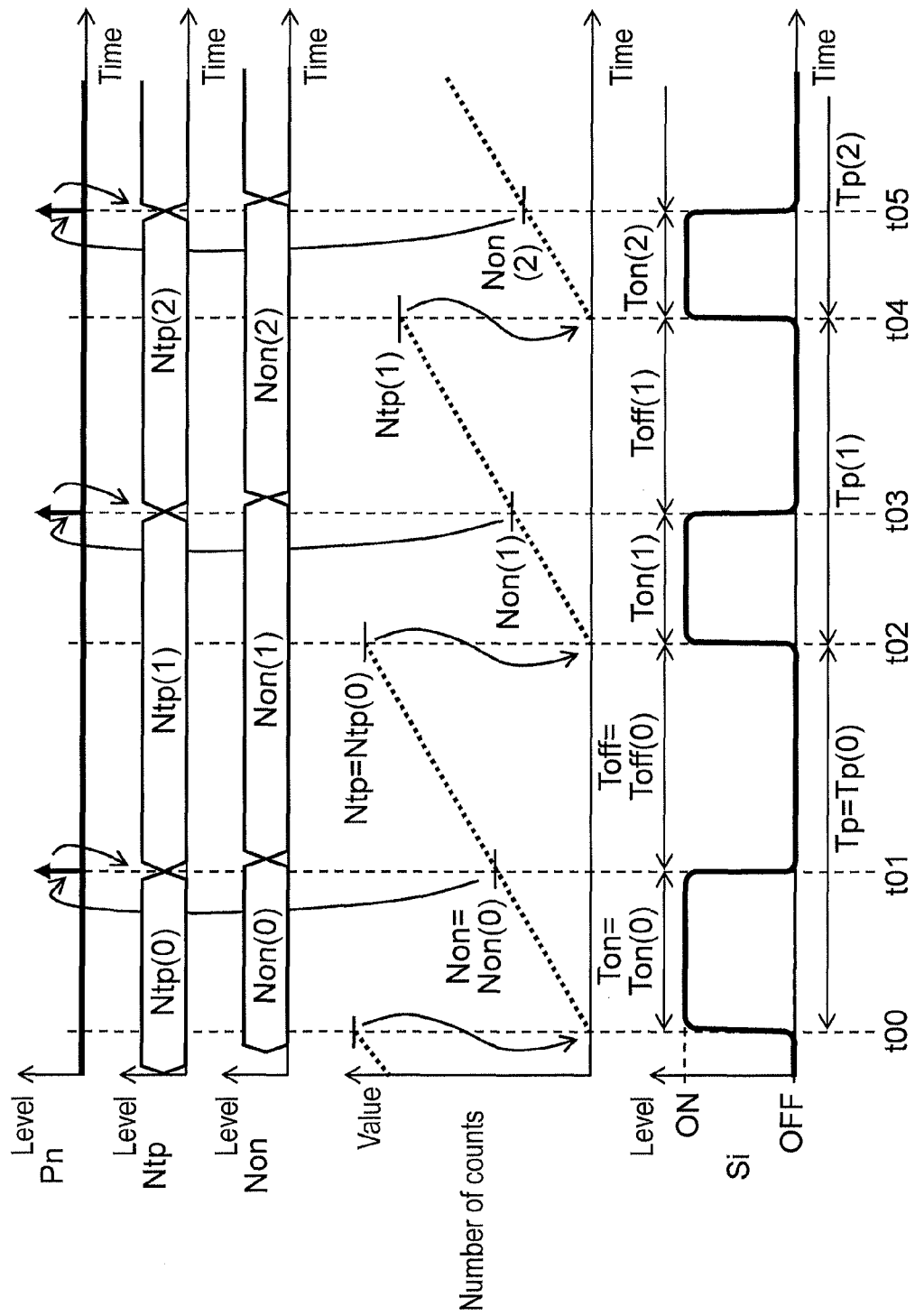
FIG. 3 is a timing chart showing one example of operation of the PWM modulating section of the host controller.

FIG. 3 is a timing chart showing one example of operation of PWM modulating section 120 having the above structure. Referring to FIG. 3, description is provided of an exemplary operation of PWM modulating section 120 in more detail. The example in FIG. 3 shows a case in which each of the pulse periods of PWM command signal Si becomes smaller every one after another by a decrement of variation dN, and a frequency component of the pulse period increases progressively as a result of it.

First, control section 110 supplies speed command signal Vr and modulation command signal Csi at such as the start of operation. In response to modulation command signal Csi, PWM period calculating section 125 outputs count value Ntp of an initial value supplied from starting period setting section 126. Count value Ntp(0) is shown in FIG. 3 as an example of count value Ntp of the initial value to be output. Modulation count-number calculating section 122 calculates count value Non(0) corresponding to the ON period of PWM command signal Si based on count value Ntp(0) and a duty factor supplied from duty calculating section 121.

Subsequently, at time t00 in FIG. 3, number of counts Cnt of the counter in timer output section 123 becomes 0 (zero). Timer output section 123 turns PWM command signal Si into an ON state at this point in time. The counter then starts counting up one by one. Timer output section 123 continues to keep the ON state of PWM command signal Si for a period in which the number of counts Cnt is smaller than count value Non(0). Timer output section 123 turns PWM command signal Si into an OFF state, and outputs preparation command signal Pn at a point (time t01) when number of counts Cnt becomes equal to count value Non(0).

Timer output section 123 continues to keep the OFF state of PWM command signal Si until the number of counts Cnt reaches count value Ntp(0) after exceeding the count value Non(0).

As a result, a first pulse period having a pulse-period duration Tp(0) is formed of ON period Ton(0) and OFF period Toff(0). A duty factor in this pulse-period duration Tp(0) is given by Ton(0)/Tp(0).

A value for setting the next pulse cycle is calculated during the OFF period Toff(0). Period variation calculating section 127 calculates variation dN in response to preparation command signal Pn. PWM period calculating section 125 calculates next count value Ntp(1), and modulation count-number calculating section 122 then calculates count value Non(1) by using count value Ntp(1).

The counter is reset thereafter at a point (time t02) when number of counts Cnt reaches count value Ntp(0), and the counter starts counting up again from number of counts Cnt of 0 (zero). That is, the next pulse period having a pulse-period duration Tp(1) is formed of ON period Ton(1) and OFF period Toff(1). Each of the subsequent pulse periods of PWM command signal Si having pulse-period duration Tp(2), Tp(3), and so on are formed thereafter in the same manner. PWM period calculating section 125 outputs count value Ntp(0) of the initial value supplied from starting period setting section 126, when calculated count value Ntp becomes equal to or below the predetermined smallest value.

Figure 4:
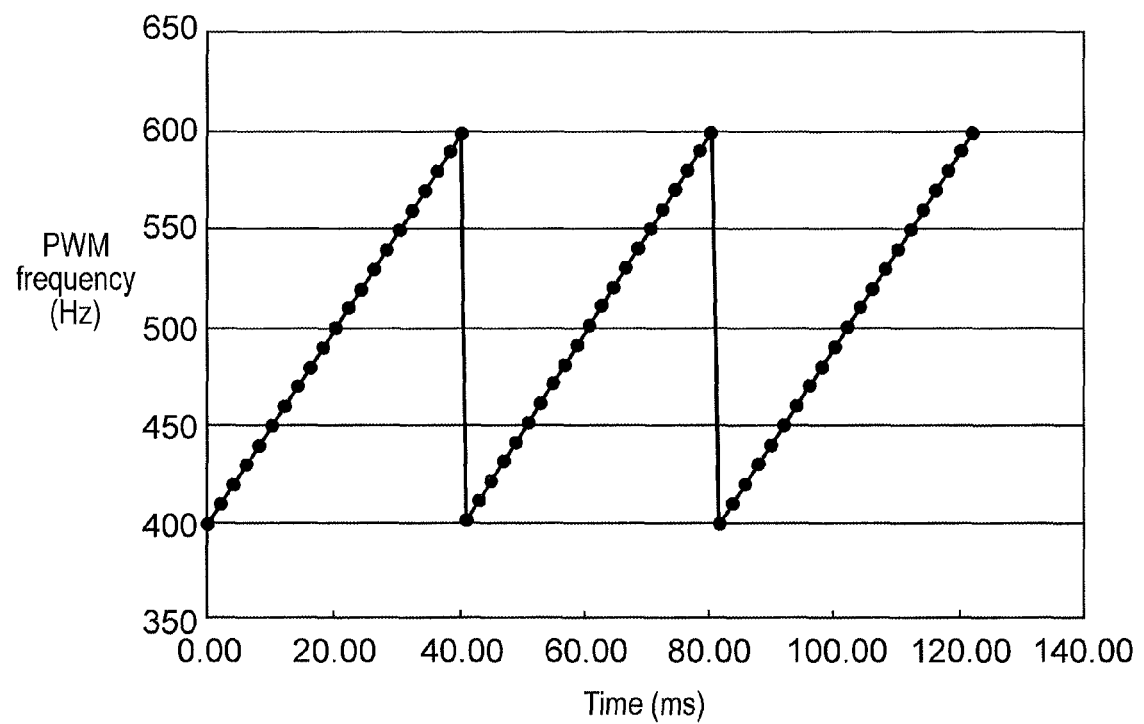
FIG. 4 is a graphic diagram showing one example of PWM frequency of a PWM command signal output from the PWM modulating section of the host controller.

FIG. 4 is a graphic diagram showing one example of PWM frequency of the PWM command signal output from PWM modulating section 120 of host controller 11. In FIG. 4, pulse period is shown by frequency, such that 400 Hz corresponds to a pulse period of 2.5 ms, and 500 Hz corresponds to a pulse period of 2 ms. In the example shown in FIG. 4, the frequency and pulse-period duration Tp are changed in 20 steps from 400 Hz to 600 Hz and from Tp(0) to Tp(20) respectively, and these steps are repeated.

Assume a case in which clock signal Ck has a frequency of 1 MHz and a duty factor of the modulation is set at 50%, to be specific, when the frequency is 400 Hz, a pulse period becomes 2.5 ms at count value Ntp of 2,500, and a pulse width of ON period becomes 1.25 ms at count value Non of 1,250. Or, when the frequency is 500 Hz, the pulse period becomes 2.0 ms at count value Ntp of 2,000, and the pulse width of ON period becomes 1.0 ms at count value Non of 1,000. In this exemplary embodiment, PWM modulating section 120 changes the individual pulse-period durations according to their corresponding pulse periods, and the pulse widths are changed with the change in the pulse-period durations even when the duty factor of modulation remain unchanged.

Next, as shown in FIG. 2, PWM demodulating section 130 comprises leading-edge detecting section 131, edge-cycle detecting section 132, duty calculating section 133, and detected speed-value calculating section 134.

In PWM demodulating section 130, PWM information signal Fp transmitted from motor control device 10 is supplied to leading-edge detecting section 131 and duty calculating section 133. As similar to the PWM command signal Si, PWM information signal Fp is a pulse train having pulse periods of which durations are individually variable, and the duration of each pulse period is made up of an ON period and an OFF period. A duty factor, i.e. a ratio of pulse width in the ON period to the pulse-period duration, is modulated by detected speed signal Vd. PWM demodulating section 130 restores detected speed signal Vd by detecting this duty factor for every pulse period.

Leading-edge detecting section 131 detects timing of a rising edge when each pulse of PWM information signal Fp rises from an OFF state to an ON state, and generates edge detection signal Pe based on this timing. The timing of this edge detection signal Pe corresponds to the start timing of each of the pulses that constitute PWM information signal Fp. The generated edge detection signal Pe is supplied to edge-cycle detecting section 132 and duty calculating section 133.

Edge-cycle detecting section 132 detects a cyclic period of edge detection signals Pe supplied sequentially from leading-edge detecting section 131. In this exemplary structure, edge-cycle detecting section 132 has a counter for counting a number of clock signals Ck. Edge-cycle detecting section 132 detects duration of the pulse period by having the counter count a number of the clocks between successive edge detection signals Pe. The counter of edge-cycle detecting section 132 operates in this manner to detect count-values Mtp in the duration of the pulse period. This detected count value Mtp corresponds to the duration of each of the pulses that constitute PWM information signal Fp. The count value Mtp is supplied to duty calculating section 133.

In this exemplary structure, duty calculating section 133 has a counter for counting a number of clock signals Ck. The counter in duty calculating section 133 starts counting at the timing of each of edge detection signals Pe, continues the counting for the duration of ON period of PWM information signal Fp, and detects count value Mon during the ON period. Furthermore, duty calculating section 133 calculates a ratio of the count value Mon to the count value Mtp. This ratio corresponds to the duty factor of PWM information signal Fp. In other words, PWM information signal Fp is demodulated by calculating this ratio. In addition, detected speed-value calculating section 134 restores detected speed signal Vd from the ratio calculated by duty calculating section 133. When the count value Mtp and the count value Mon are assumed to be 2,000 and 1,000 respectively, for instance, the ratio becomes 0.5 and the duty factor becomes 50%. Detected speed-value calculating section 134 obtains such a result that the detected rotation speed is 1,000 (rpm) from the duty of 50%, or 500 (rpm) from the duty factor of 25%, for example.

Described next pertains to a detailed structure of PWM demodulating section 20 and PWM modulating section 30 in motor control device 10.

Figure 5:
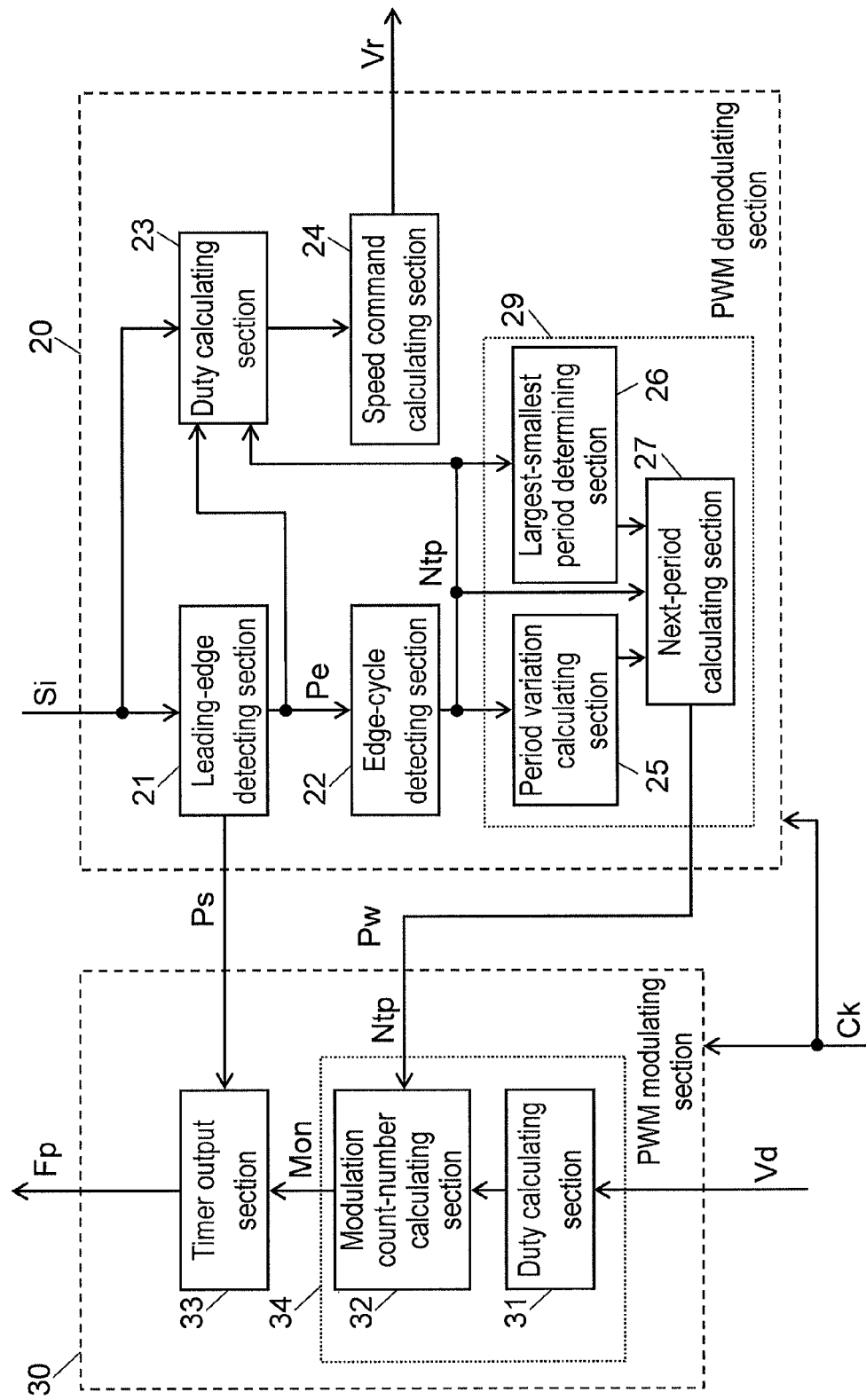
FIG. 5 is a block diagram of a PWM demodulating section and a PWM modulating section of a motor control device according to one exemplary embodiment of the present invention.
Figure 6:
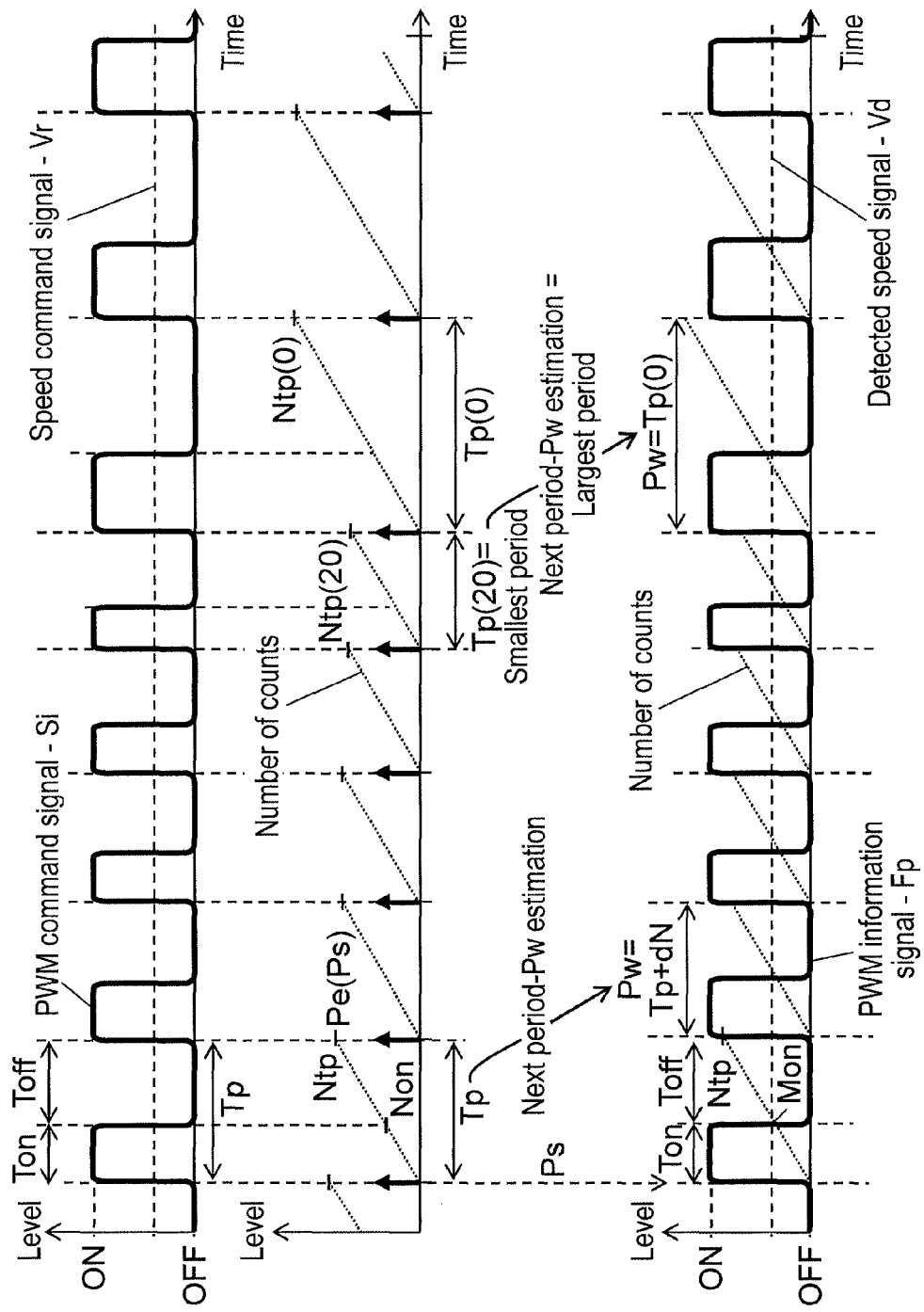
FIG. 6 is a graphic diagram showing signal waveforms and the like at various points in the motor control device.

FIG. 5 is a block diagram showing an exemplary structure of PWM demodulating section 20 and PWM modulating section 30 of motor control device 10 according to this embodiment of the invention. In addition, FIG. 6 is graphic diagrams showing signal waveforms and the like at various points in motor control device 10. The graph at the top of FIG. 6 shows a signal waveform of PWM command signal Si in a solid line, the graph at the middle of FIG. 6 shows timing of pulse start signal Ps in a solid line, and the graph at the bottom of FIG. 6 shows a signal waveform of PWM information signal Fp, also in a solid line.

As shown in FIG. 5, clock signal Ck is supplied to PWM demodulating section 20 and PWM modulating section 30. The structure shown in FIG. 5 is an example that is configured to generate a PWM signal by using a counter for counting clock signals Ck.

To begin with, PWM demodulating section 20 comprises leading-edge detecting section 21, edge-cycle detecting section 22, duty calculating section 23, speed command calculating section 24, period variation calculating section 25, largest-smallest period determining section 26, and next-period calculating section 27, as shown in FIG. 5.

In PWM demodulating section 20, PWM command signal Si transmitted from host controller 11 is supplied to leading-edge detecting section 21 and duty calculating section 23. PWM command signal Si is a pulse train having pulse-period durations Tp that vary for every pulse period, and the duration of each pulse period is made up of ON period Ton of a high level and OFF period of a low level, as shown at the top of FIG. 6. Speed command signal Vr is restored by detecting a duty factor that is a ratio of ON period Ton to the pulse-period duration Tp. What is shown in the graph at the top of FIG. 6 is an example, wherein speed command signal Vr stays constant, whereas the pulse-period duration Tp and pulse width Ton of the ON period of PWM command signal Si change with the passage of time.

Leading-edge detecting section 21 detects timing of a rising edge when each pulse of PWM command signal Si rises from an OFF state to an ON state, and generates edge detection signal Pe according to this timing. The timing of this edge detection signal Pe corresponds to the start timing of each of the pulses that constitute PWM command signal Si, as shown in the graph at the middle of FIG. 6. The generated edge detection signal Pe is supplied to edge-cycle detecting section 22 and duty calculating section 23. This edge detection signal Pe is also supplied to PWM modulating section 30 as pulse start signal Ps. Leading-edge detecting section 21 configured to operate in the above manner is provided in this embodiment as one example of an edge timing detector for detecting timing of an edge that changes into a given direction.

Edge-cycle detecting section 22 detects a cyclic period of edge detection signals Pe supplied sequentially from leading-edge detecting section 21. In this exemplary structure, edge-cycle detecting section 22 has a counter for counting a number of clock signals Ck. Edge-cycle detecting section 22 detects the cyclic period of edge detection signals Pe by having the counter count the number of clocks between successive edge detection signals Pe. The counter in edge-cycle detecting section 22 operates in this manner to detect a count value Ntp in pulse-period duration Tp, as shown in the graph at the middle of FIG. 6. This detected count value Ntp corresponds to pulse-period duration Tp of each of the pulses that constitute PWM command signal Si. The count value Ntp is supplied to duty calculating section 23, as well as period variation calculating section 25, largest-smallest period determining section 26 and next-period calculating section 27.

In this exemplary structure, duty calculating section 23 also has a counter for counting a number of clock signals Ck. The counter in duty calculating section 23 starts counting at the timing of edge detection signal Pe, continues the counting for duration of ON period Ton of PWM command signal Si, and detects a count value Non during the ON period Ton, as shown in the middle of FIG. 6. Furthermore, duty calculating section 23 calculates a ratio of the count value Non to the count value Ntp. This ratio corresponds to the duty factor of PWM command signal Si. PWM command signal Si is demodulated by calculating this ratio. In addition, speed command calculating section 24 restores speed command signal Vr from the ratio calculated by duty calculating section 23. Assume that the count value Ntp is 2,000 and the count value Non is 1,000, for instance, the ratio becomes 0.5 and a duty factor of 50%. Speed command calculating section 24 restores the rotation speed command as being 1,000 (rpm) from the duty factor of 50%, for example, or 500 (rpm) if the duty factor is 25%.

On the other hand, period variation calculating section 25, largest-smallest period determining section 26 and next-period calculating section 27 make up next-period estimating section 29. Next-period estimating section 29 estimates pulse-period duration of the next pulse period to be transmitted with PWM command signal Si, and forwards the estimated pulse-period duration pulse period signal Pw to PWM modulating section 30.

Period variation calculating section 25 calculates variation dN in pulse-period duration for each of the pulse periods of PWM command signal Si. As an example, period variation calculating section 25 calculates variation dN by obtaining a difference between the preceding pulse-period duration and the present pulse-period duration by using their count values Ntp. When the preceding count value Ntp and the present count value Ntp are Ntp(0) and Ntp(1) respectively, for instance, then the variation dN is given by dN=Ntp(1)−Ntp(0).

Largest-smallest period determining section 26 determines whether the count value Ntp presently being processed becomes equal to a predetermined largest value or a predetermined smallest value. Largest-smallest period determining section 26 then sends a result of the determination to next-period calculating section 27.

Next-period calculating section 27 outputs count values Ntp one after another for every pulse period after changing it by a value of variation dN supplied from period variation calculating section 25. Furthermore, next-period calculating section 27 outputs count value Ntp of the initial value when it receives a result of determination from largest-smallest period determining section 26 indicating that the number becomes either the largest value or the smallest value. In the graph at the middle of FIG. 6, Ntp(20) denotes the smallest count value corresponding to the smallest value of pulse-period duration Tp(20). Next-period calculating section 27 outputs a pulse period signal Pw representing count value Ntp(0), as count value Ntp corresponding to the next pulse-period duration Tp, when largest-smallest period determining section 26 makes such a determination that the count value becomes Ntp(20).

In this exemplary embodiment, the pulse period signal Pw representing pulse-period durations that are synchronized with the individual pulse periods of PWM command signal Si, is generated by the above operation of next-period estimating section 29.

Secondly, PWM modulating section 30 comprises duty calculating section 31, modulation count-number calculating section 32 and timer output section 33, as shown in FIG. 5.

Duty calculating section 31 calculates a duty factor used to carry out pulse-width modulation from detected speed signal Vd supplied to it. For example, duty calculating section 31 calculates a duty factor according to a rotation speed indicated by detected speed signal Vd, such that the duty factor is 50% when a value of detected speed signal Vd is 1,000 (rpm), or the duty factor is 25% when the value is 500 (rpm).

Modulation count-number calculating section 32 calculates a pulse width in an ON period of PWM information signal Fp based on count value Ntp corresponding to a pulse-period duration indicated by the supplied pulse period signal Pw and a duty factor supplied from duty calculating section 31. To be specific, modulation count-number calculating section 32 multiplies count value Ntp indicated by pulse period signal Pw by the duty factor, to calculate count value Mon used for generating PWM information signal Fp.

Duty calculating section 31 and modulation count-number calculating section 32 make up pulse-width calculating section 34. In other words, pulse-width calculating section 34 calculates the pulse width in the ON period of PWM information signal Fp based on detected speed signal Vd and a cyclic period between pulse edges detected by edge-cycle detecting section 22.

Timer output section 33 generates a signal of pulse train each of which pulses goes on only for a period corresponding to count value Mon from the timing of pulse start signal Ps in each pulse period indicated by pulse period signal Pw, as shown at the bottom of FIG. 6. To be specific, timer output section 33 in this exemplary structure has a counter for counting a number of clock signals Ck. The counter in timer output section 33 starts counting from 0 (zero) at the timing of pulse start signal Ps, and continues the counting up to the count value Mon. Timer output section 33 forms an output of PWM information signal Fp that stays at an ON state for a period in which the counting is continued, and switches to an OFF state from the point when the counting ends. Timer output section 33 also functions as a PWM information signal generating section for generating and outputting PWM information signal Fp based on a pulse width calculated by pulse-width calculating section 34 and pulse start signal Ps supplied from leading-edge detecting section 21.

PWM demodulating section 20 and PWM modulating section 30 in this exemplary embodiment are configured as discussed above. In other words, the timing at which each pulse of PWM information signal Fp rises is based on pulse start signal Ps restored from PWM command signal Si. Accordingly, phases of the individual pulses of PWM information signal Fp are synchronized with phases of the pulses of PWM command signal Si. Moreover, a pulse period of each individual pulse of PWM information signal Fp is based on pulse period Tp restored from PWM command signal Si. Thus, pulse periods of the individual pulses of PWM information signal Fp are also synchronized with pulse periods of the pulses of PWM command signal Si. By virtue of synchronization of PWM information signal Fp with PWM command signal Si, the magnetic field radiated from signal transmission line 19f of PWM information signal Fp becomes generally opposite in direction of the magnetic field radiated from signal transmission line 19s of PWM command signal Si. Unwanted emissions radiated from both signal transmission lines 19 are thus cancelled, thereby achieving a reduction of the spurious emissions.

In addition, PWM command signal Si is formed of a pulse train including a plurality of pulse periods having different pulse-period durations from one another. Also, PWM information signal Fp is synchronized with PWM command signal Si. As a result, frequency components contained in the individual pulse periods are spread out and kept at a low level, thereby achieving further reduction of the spurious emission radiated from both the transmission lines.

In this exemplary embodiment, an information signal transmitted with PWM information signal Fp includes detected speed signal Vd. Here, detected speed signal Vd becomes nearly equal to speed command signal Vr, when the rotation speed of the rotor controlled according to speed command signal Vr of host controller 11 comes to reach a speed directed by this speed command signal Vr. In other words, a waveform of PWM information signal Fp becomes generally analogous to a waveform of PWM command signal Si when the rotation speed reaches the directed speed. Two such signals of similar waveforms are transmitted through both signal transmission lines 19s and 19f. The magnetic fields radiated from both these signal lines therefore become similar with their directions opposite to each other, thereby cancelling out the unwanted emissions more effectively, and further improving the effect of reducing the spurious emissions.

It is also feasible to employ a structure configured to avoid leading-edge detecting section 21 from outputting pulse start signal Ps during a period when it does not detect any edge, and to avoid timer output section 33 from outputting PWM information signal Fp during the same period accordingly. The structure so configured can make timer output section 33 output PWM information signal Fp only when it receives PWM command signal Si, which reduce a frequency of sending PWM information signal Fp needlessly, thereby improving further the effect of reducing the spurious emissions.

Although what has been described above is an example of structure comprising PWM demodulating section 20 and PWM modulating section 30 made up by using counters and the like devices, it is also possible to configure them with a microcomputer or the like devices. That is, the functions of PWM demodulating section 20 and PWM modulating section 30 described above may be replaced with a program that can be installed into the structure to execute the above processes. Moreover, the structure discussed above is one example configured to modulate a pulse width of ON period starting at a rising point of the pulse as a reference. However, the structure can be altered such that it uses a falling point of the pulse as the reference, or modulates a pulse width of OFF period. In essence, the structure only needs to have motor control device 10 that is capable of generating and transmitting PWM information signal Fp in synchronization with received PWM command signal Si.

Figure 7:
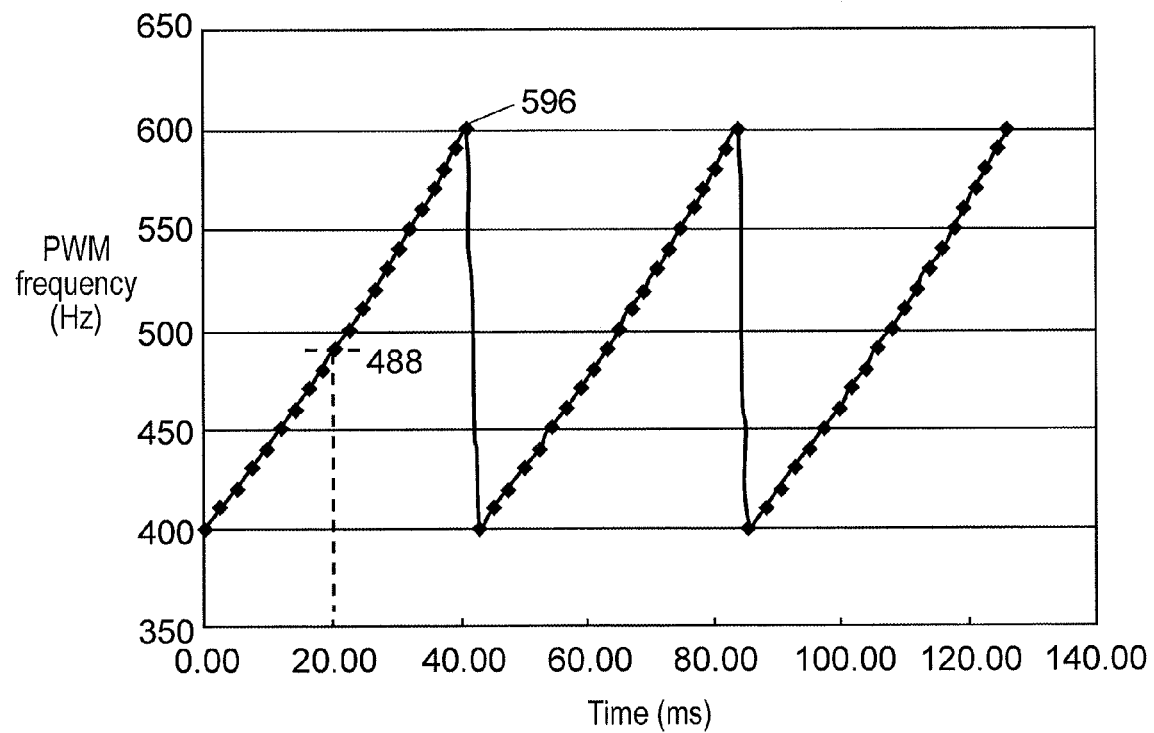
FIG. 7 is a graphic diagram showing another example of PWM frequency of a PWM command signal output from the PWM modulating section of the host controller of the motor control system.

In the description above, as a technique of forming PWM command signal Si with a pulse train containing a plurality of pulse periods having different pulse-period durations from one another, described is one example that a frequency of pulse period of each of the pulses is increased one after another by a fixed value of variation dN according to a predetermined pattern, as shown in FIG. 4. However, the frequency of pulse period of each of the pulses may be decreased according to the predetermined pattern, for instance, or changed otherwise according to any other pattern. In the pattern shown in FIG. 4, for example, the higher the frequency the more frequent it becomes that higher-side pulse periods appear, so that the pattern do not become completely uniform in terms of frequency distribution. Therefore, a frequency at each point in time may be determined, for instance, according to a function defined by the following expression:

$$\text{PWM frequency (Hz)} = f_{start} \times \exp(dF \times (t/1000)) \quad \text{[Expression 1]}$$

where $f_{start}$ is starting frequency (Hz), dF is variation in frequency (Hz/one pulse), and t is elapsed time (ms). FIG. 7 is a graph showing changes in the frequency according to this expression. In PWM modulating section 120, period variation calculating section 127 may be so configured that it calculates variations dN one by one on the basis of the above expression.

Next, description is provided of a detailed structure of brushless motor 50.

Figure 8:
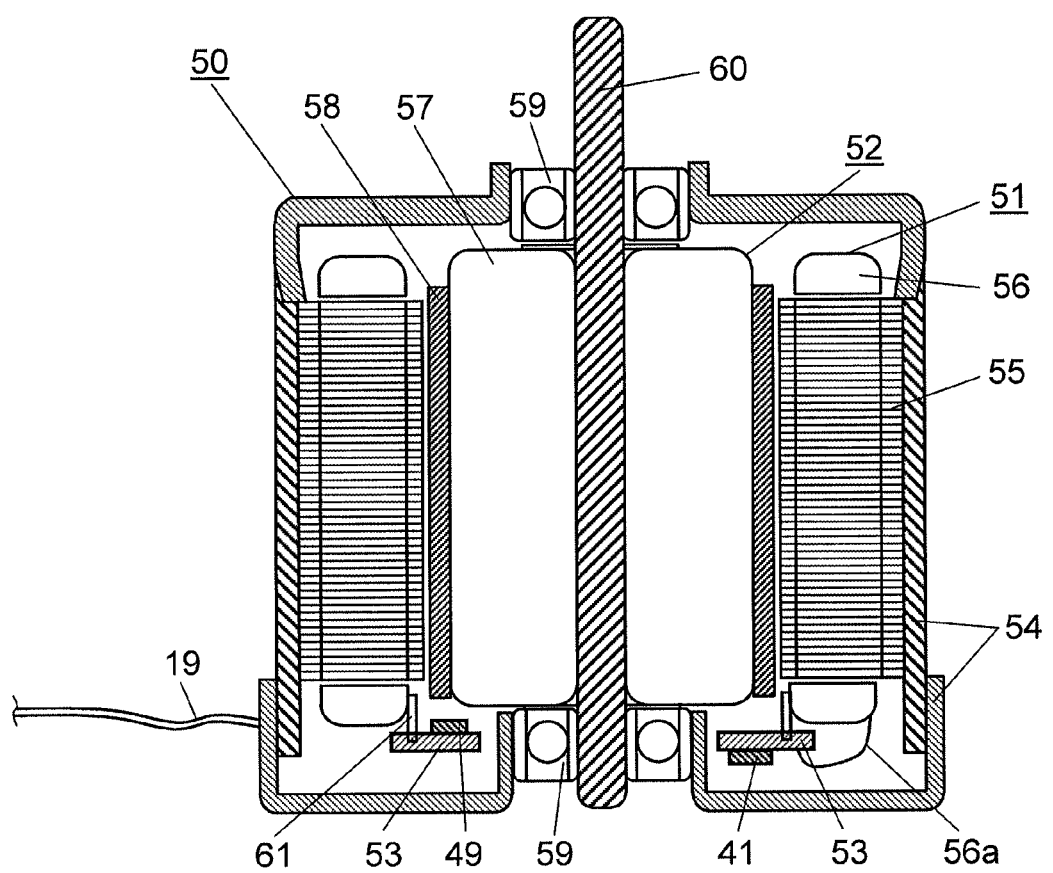
FIG. 8 is a sectional view of a brushless motor according to one exemplary embodiment of the present invention.

FIG. 8 is a sectional view of brushless motor 50 according to one exemplary embodiment of the present invention. In this exemplary embodiment, description is given of an example of inner-rotor type brushless motor 50 having a rotor disposed rotatably to an interior side of a stator.

As shown in FIG. 8, brushless motor 50 comprises stator 51, rotor 52, circuit board 53 and motor case 54. Motor case 54 is formed of a metal having a sealed cylindrical shape, and brushless motor 50 has such a structure that stator 51, rotor 52 and circuit board 53 are disposed inside motor case 54.

In FIG. 8, stator 51 is constructed by having windings 56 of individual phases wound around stator core 55. Stator core 55 has a plurality of protruding poles that protrude inward. Stator core 55 has an outer periphery of generally a cylindrical shape, which is fixed to motor case 54. Rotor 52 is inserted in stator 51 with a gap between them. Rotor 52 has permanent magnet 58 of a cylindrical shape secured to an outer periphery of rotor frame 57, and is disposed rotatably around rotary shaft 60 supported by bearings 59. In other words, end surfaces of the protruding poles of stator core 55 are positioned in a manner to confront an outer peripheral surface of permanent magnet 58. Motor 40 is thus constructed by having stator 51 of such configuration and rotor 52 supported by bearings 59.

In addition, this brushless motor 50 has circuit board 53 disposed inside motor case 54 with various circuit components 41 mounted on circuit board 53. These circuit components 41 concretely make up motor control device 10 for driving and controlling motor 40. Additionally, position detection sensors 49 like hall elements are mounted to circuit board 53 for detecting a rotating position of rotor 52. Support member 61 is attached to stator core 55, and circuit board 53 is fixed within motor case 54 by this support member 61. End portions of individual windings 56U, 56V and 56W for U-phase, V-phase and W-phase are routed out of stator 51 to serve as lead wires 56a, which are connected individually to circuit board 53.

Signal transmission lines 19 are also extended out of brushless motor 50 for connection with host controller 11.

When a power supply voltage and PWM command signal Si are supplied from the outside to brushless motor 50 constructed as above, a drive current flows to windings 56 from motor control device 10 formed on circuit board 53, which in turn generates magnetic field from stator core 55. The magnetic field from stator core 55 and magnetic field of permanent magnet 58 produce an attractive force and a repulsive force corresponding to polarities of these magnetic fields, and these forces make rotor 52 rotate around rotary shaft 60.

As described above, the motor control system of the present invention comprises a host controller for generating a PWM command signal based on a command signal, transmitting the PWM command signal generated and receiving a PWM information signal generated based on an information signal, a motor control device for receiving the PWM command signal generated based on the command signal, generating the PWM information signal based on the information signal and transmitting the PWM information signal generated, a signal transmission line for transmitting the PWM command signal and the PWM information signal individually as pulse signals, and a motor of which rotation is controlled by the motor control device. The host controller generates a PWM command signal having a duty factor, i.e. a ratio of a pulse width to pulse-period duration, modulated by the command signal, and transmits the PWM command signal to the motor control device via the signal transmission line. The motor control device generates a PWM information signal having a duty factor modulated by the information signal, and transmits the PWM information signal in synchronization with the PWM command signal to the host controller via the signal transmission line. The PWM command signal transmitted by the host controller includes a plurality of pulse periods having different pulse-period durations from one another.

The motor control device of the present invention comprises a PWM demodulating section for demodulating the PWM command signal and restoring the command signal, a rotation control section for generating a driving signal for the motor according to the command signal, a power drive section for generating a drive voltage to energize and drive a winding of the motor according to the driving signal, an information signal generating section for generating the information signal to be transmitted to outside, and a PWM modulating section for generating the PWM information signal having the duty factor modulated by the information signal. The PWM modulating section is configured to generate the PWM information signal in synchronization with pulse-period duration of the PWM command signal, and output the same.

The brushless motor of the present invention has a structure comprising a rotor, a stator provided with a three-phase winding, and the motor control device described above for energizing and driving the winding.

Furthermore, a motor control method of the present invention uses a host controller for transmitting to a motor control device, a PWM command signal including a plurality of pulse periods having different pulse-period durations from one another, and having a duty factor, i.e. a ratio of a pulse width to the pulse-period duration, modulated by a command signal. The motor control device restores the command signal from the PWM command signal received, rotates a motor based on the restored command signal, and generates an information signal to be transmitted to the outside. The motor control device also generates a PWM information signal having a duty factor modulated by the information signal in synchronization with the pulse periods of the PWM command signal. The motor control device then outputs the generated PWM information signal to the host controller.

By virtue of the configurations stated above, the PWM command signal and the PWM information signal become equal in their pulse-period durations because they are synchronized, and both these signals are transmitted in directions opposite to each other. As a result, magnetic field radiated from the transmission line of the PWM command signal and magnetic field radiated from another transmission line of the PWM information signal become generally opposite in their directions at all the time. Unwanted emissions radiated from both the transmission lines are thus cancelled out, and spurious emissions can be reduced.

In addition, frequency components of the PWM command signal and the PWM information signal synchronized with the PWM command signal are not concentrated on one frequency but spread out widely and the frequency components can be kept at low levels, since the PWM command signal includes a plurality of pulse periods having different pulse-period durations from one another. Therefore, the unwanted emissions radiated from both these transmission lines can be reduced even further.

Accordingly, the present invention can provide the motor control system, motor control device, brushless motor and motor control method having an advantage of reducing the spurious emissions with simple structures not requiring any special component and material for the noise preventive measures.

INDUSTRIAL APPLICABILITY

The motor control system, motor control device, brushless motor and motor control method of the present invention are suitable for motors of electrical installation of which a reduction of spurious emissions is especially needed since they are capable of reducing unwanted emissions, and that they are also useful for motors used in electrical apparatuses.

The invention claimed is:

1. A motor control system having a motor control device for controlling rotation of a motor according to a command of a host controller, the system comprising:
   the host controller for generating a PWM command signal based on a command signal, transmitting the PWM command signal generated and receiving a PWM information signal generated based on an information signal;
   the motor control device for receiving the PWM command signal generated based on the command signal, generating the PWM information signal based on the information signal and transmitting the PWM information signal generated;
   two signal transmission lines in physical proximity to each other and connecting the host controller to the motor control device, the two signal transmission lines for transmitting the PWM command signal from the host controller to the motor control device, and transmitting the PWM information signal from the motor control device to the host controller individually as pulse signals; and
   the motor of which rotation is controlled by the motor control device,
   wherein
   the host controller generates the PWM command signal having a duty factor, that is a ratio of a pulse width to pulse-period duration, modulated by the command signal, and transmits the PWM command signal to the motor control device via a first transmission line of the two signal transmission lines,
   the motor control device generates the PWM information signal having a duty factor modulated by the information signal, and transmits the PWM information signal in synchronization with the PWM command signal to the host controller via a second transmission line of the two signal transmission lines, such that a first magnetic field radiated from the first transmission line and a second magnetic field radiated from the second transmission line cancel each other out, and
   the PWM command signal transmitted by the host controller includes a plurality of pulse periods having different pulse-period durations from one another.

2. The motor control system of claim 1, wherein:
   the command signal is a speed command signal that indicates a rotation speed of the motor; and
   the information signal is a detected speed signal that shows an actual speed of rotation detected on the motor.

3. The motor control system of claim 1, wherein the host controller generates the PWM command signal of which the pulse-period durations are changed for each of rotation detected an actual speed of the rotation of the motor, and transmits the PWM command signal generated.

4. The motor control system of claim 1, wherein the host controller generates the PWM command signal of which the pulse-period durations are changed one after another by a predetermined width according to a predetermined pattern, and transmits the PWM command signal generated.

5. The motor control system of claim 1, wherein the host controller generates the PWM command signal of which the pulse-period durations are changed according to a given equation to uniformalize appearing frequencies of the individual pulse-period durations, and transmits the generated PWM command signal.

6. The motor control system of claim 1, wherein the host controller comprises:
   a PWM period calculating section for calculating pulse-period duration of the PWM command signal for each of the pulse periods of the PWM command signal;
   a pulse-width calculating section for calculating a pulse width base on the pulse-period duration calculated by the PWM period calculating section and the command signal; and
   a host side PWM modulating section for generating the PWM command signal based on the pulse-period duration calculated by the PWM period calculating section and the pulse width calculated by the pulse-width calculating section, and outputting the PWM command signal.

7. A motor control device, comprising:
   a first connection to a host controller for receiving a PWM command signal over a first signal transmission line, the PWM command signal includes a plurality of pulse periods having different pulse-period durations from one another, and has a duty factor, that is a ratio of a pulse width to the pulse-period duration, modulated by a command signal, and to control a motor to rotate according to the command signal restored from the PWM command signal received;
   a PWM demodulating section for demodulating the PWM command signal and restoring the command signal;
   a rotation control section for generating a drive signal of the motor according to the command signal;
   a power drive section for generating a drive voltage to energize and drive a winding of the motor based on the drive signal;
   an information signal generating section for generating an information signal to be sent to an outside;
   a PWM modulating section for generating a PWM information signal having the duty factor modulated by the information signal; and
   a second connection to the host controller for transmitting the PWM information signal over a second signal transmission line in physical proximity to the first signal transmission line,
   wherein the PWM modulating section generates and outputs the PWM information signal in synchronization with the pulse-period durations of the PWM command signal such that a first magnetic field radiated from the first transmission line and a second magnetic field radiated from the second transmission line cancel each other out.

8. The motor control device of claim 7, wherein:
   the command signal is a speed command signal that indicates a rotation speed of the motor; and
   the information signal is a detected speed signal that shows an actual speed of rotation detected on the motor.

9. The motor control device of claim 7, wherein
the PWM demodulating section comprises:
- an edge-timing detecting section for detecting a timing at which an edge changes into a given direction;
- an edge-cycle detecting section for detecting a cyclic period of the edge; and
- a next-period calculating section for calculating next pulse-period duration based on the cyclic period of the edge detected by the edge-cycle detecting section and a value of change in the pulse-period duration according to a predetermined pattern, and the PWM modulating section comprises:
- a pulse-width calculating section for calculating a pulse width of the PWM information signal based on the information signal and the pulse-period duration calculated by the next-period calculating section; and
- a PWM information signal generating section for generating the PWM information signal based on the pulse width calculated by the pulse-width calculating section and the timing detected by the edge-timing detecting section, and outputting the PWM information signal.

10. A brushless motor comprising a rotor, a stator provided with a three-phase winding, and the motor control device of claim 7 for energizing and driving the winding.

11. A motor control method for controlling a motor, the method comprising:

transmitting from the host controller to the motor control device a PWM command signal over a first signal transmission line, the PWM command signal including a plurality of pulse periods having different pulse-period durations from one another, and having each of which a duty factor, that is a ratio of a pulse width to pulse-period duration, modulated by the command signal;

restoring the command signal from the PWM command signal received in the motor control device, making the motor rotate based on the command signal restored;

generating an information signal to be transmitted to an outside;

generating a PWM information signal having a duty factor modulated by the information signal in synchronization with the pulse-period duration of the PWM command signal;

transmitting the PWM information signal over a second signal transmission line in physical proximity to the first signal transmission line; and outputting the generated PWM information signal from the motor control device to the host controller, such that a first magnetic field radiated from the first transmission line and a second magnetic field radiated from the second transmission line cancel each other out.

* * * * *